US006673248B2

(12) United States Patent
Chowdhury

(10) Patent No.: US 6,673,248 B2
(45) Date of Patent: Jan. 6, 2004

(54) APPARATUS AND METHOD OF PURIFYING WATER WITH OZONE

(75) Inventor: Sudhir Chowdhury, Stockholm (SE)

(73) Assignee: S C Trade & Consult AB, Farsta (SE)

( * ) Notice: Subject to any disclaimer, the term of this patent is extended or adjusted under 35 U.S.C. 154(b) by 0 days.

(21) Appl. No.: 10/182,758
(22) PCT Filed: Feb. 2, 2001
(86) PCT No.: PCT/SE01/00201
§ 371 (c)(1),
(2), (4) Date: Aug. 2, 2002
(87) PCT Pub. No.: WO01/56936
PCT Pub. Date: Aug. 9, 2001

(65) Prior Publication Data
US 2003/0000896 A1 Jan. 2, 2003

(30) Foreign Application Priority Data
Feb. 2, 2000 (SE) .......................... 0000344-2

(51) Int. Cl.⁷ ................................ C02F 1/78
(52) U.S. Cl. ..................... 210/739; 210/760; 210/764; 210/192; 210/767
(58) Field of Search ................ 210/192, 96.1, 210/760, 764, 739–746, 767; 422/186.07

(56) References Cited

U.S. PATENT DOCUMENTS 5,158,454 A * 10/1992 Viebahn et al.
5,882,588 A * 3/1999 Laberge
6,001,247 A * 12/1999 Schulz

FOREIGN PATENT DOCUMENTS

| DE | 2440181 A1 | 1/1976 |
| DE | 2938517 A1 | 4/1981 |
| DK | 166452 B1 | 5/1993 |
| EP | 0163750 A1 | 12/1985 |
| EP | 0315508 A1 | 5/1989 |
| EP | 0544744 A1 | 6/1993 |
| EP | 0652182 A1 | 5/1995 |
| SE | 28540 | 7/1908 |
| WO | WO 8001906 | 9/1980 |
| WO | WO 9742924 | 11/1997 |
| WO | WO 9816473 | 4/1998 |
| WO | WO 9946201 | 9/1999 |

OTHER PUBLICATIONS

McGraw–Hill Encyclopedia of Science & Technology; 14:tow–zyt (Not dated).

Edelstein, et al., Efficacy of Ozone in Eradication of *Legionella pneumophila* from Hospital Plumbing Fixtures. Applied and Environmental Microbiology. 44(6):1330–1334 (1982).

Pope, et al., The Effect of Ozone on *Legionella pneumophila* and Other Bacterial Populations in Cooling Towers. Current Microbiology. 10:89–94 (1984).

Stout, et al., Susceptibility of Members of the Family *Legionellaceae* to Thermal Stress: Implications for Heat Eradication Methods in Water Distribution Systems. Applied and Environmental Microbiology. 52(2):396–399 (1986).

(List continued on next page.)

*Primary Examiner*—Terry K. Cecil
(74) *Attorney, Agent, or Firm*—Browdy and Neimark, P.L.L.C.

(57) ABSTRACT

A method for purifying a flow of water, by eliminating any Legionella bacteria present therein using (a) an ozone generator, (b) an ozone injector for injecting ozone into the flow of water, (c) a mixing chamber for mixing the ozone with the flow of water; (d) an outlet for the flow of water, and (e) an electronic controller for the operation thereof: wherein the mixing chamber is of an inner geometry such as to create turbulence in the flow of water therein.

12 Claims, 6 Drawing Sheets

OTHER PUBLICATIONS

Baltch, et al., Microbicidal activity of MDI–P against *Candida albicans, Staphylococcus aureus, Pseudomonas aeruginosa* and *Legionella pneumophila*. Am J Infect Control. 28:251–251 (2000).

Lin, et al., Disinfection of Water Distribution Systems for *Legionella*. Seminars in Respiratory Infections. 13(2):147–159 (1998).

Botzenhart, et al., Inactivation of Bacteria and Coliphages by Ozone and Chlorine Dioxide in a Continuous Flow Reacto. Wat. Sci. Tech. 27:363–370 (1993).

Lev, et al., Evaluation of Ozone Disinfection Systems: Characteristic Time $T$. Journal of Environmental Engineering. 118(2):268–285 (1992).

Muraca, et al., Comparative Assessment of Chlorine, Heat, Ozone, and UV Light for Killing *Legionella pneumophila* within a Model Plumbing System. Applied and Environmental Microbiology. 53(2):447–453 (1987).

Yu, et al. *Legionella* Disinfection of Water Distribution Systems: Principles, Problems, and Practice. Infection Control and Hospital Epidemiology. 14(10):567–570 (1993).

Muraca, et al. Disinfection of Water Distribution Systems for Legionella: A Review of Application Procedures and Methodologies. Infect Control Hosp Epidemiol 11(2):79–99 (1990).

Domingue, et al. Effects of Three Oxidizing Biocides on *Legionella Pneumophila* Serogroup 1. Applied and Environmental Microbiology. 54(3):741–747 (1988).

Sobsey. Inactivation of Health–Related Microorganisms in Water by Disinfection Processes. Wat. Sci. Tec. (3):179–191 (1989).

* cited by examiner

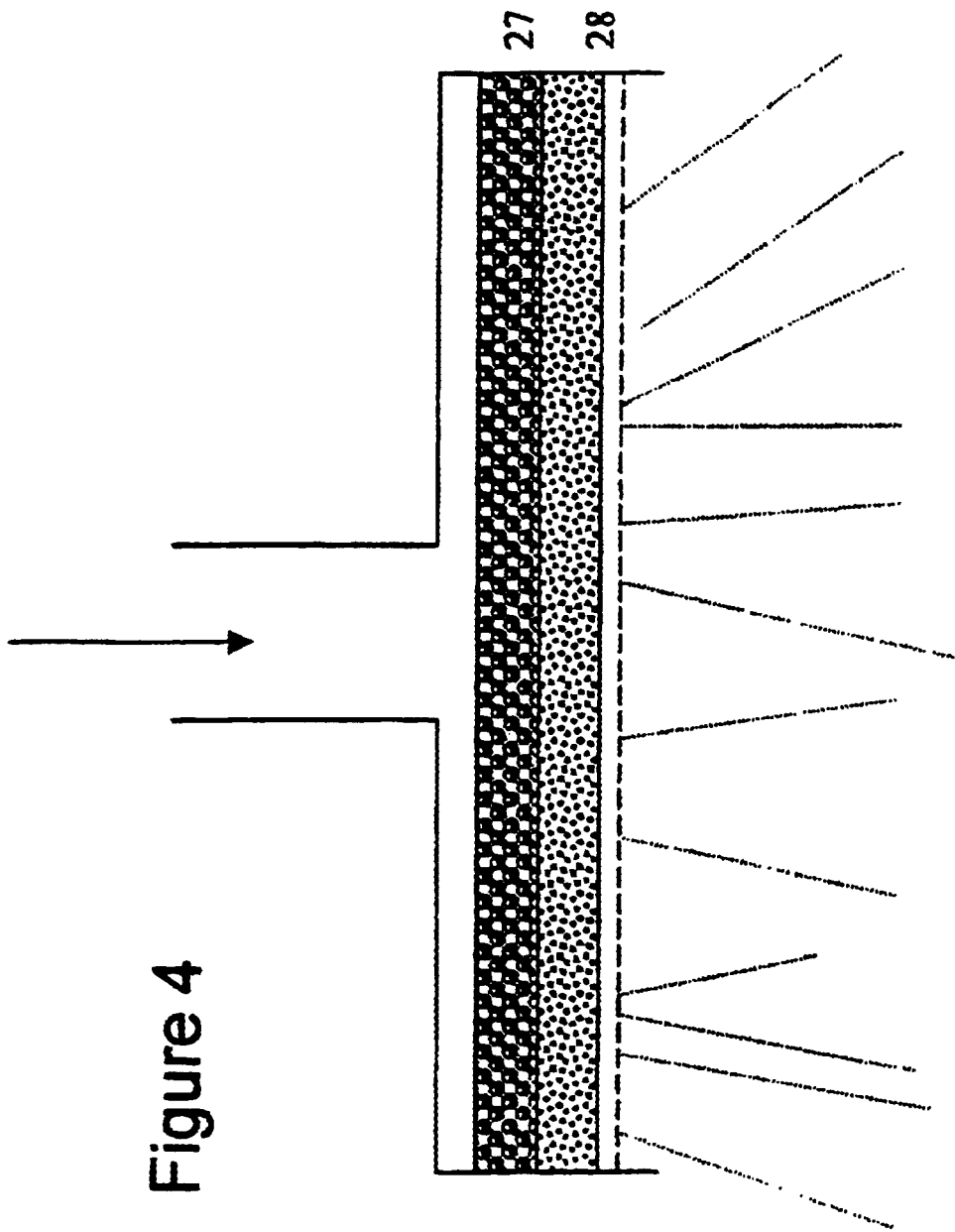

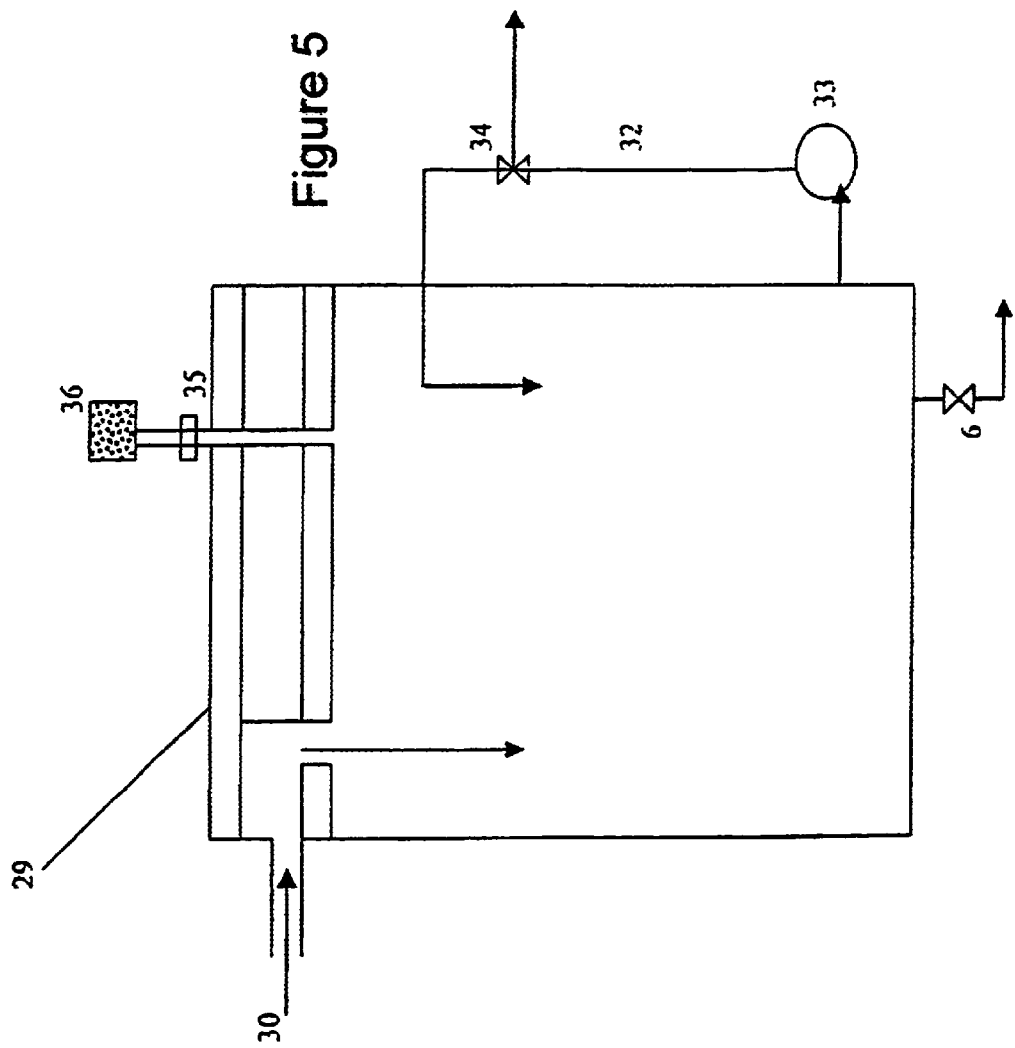

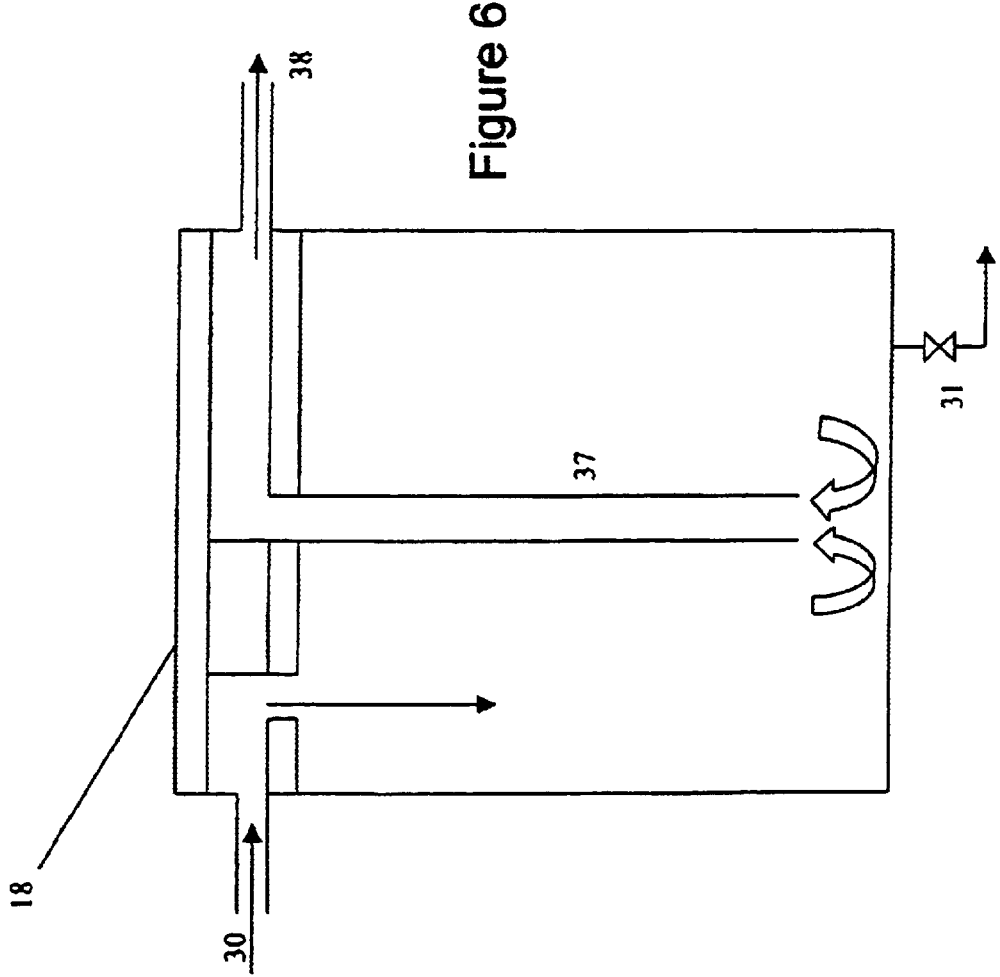

APPARATUS AND METHOD OF PURIFYING WATER WITH OZONE

CROSS-REFERENCE TO RELATED APPLICATIONS

The present application is filed under the provisions of 35 U.S.C. 371 based upon PCT/SE01/00201, filed Feb. 2, 2001, based upon Swedish application 0000344-2, filed Feb. 2, 2000.

TECHNICAL FIELD

The present invention relates to the field of water purification. More specifically, it relates to the field of treatment of water in view of eliminating therefrom any bacteria of the genus Legionella, in particular of the species *Legionella pneumophila*, using an apparatus and a method wherein an ozone containing gas is utilised.

BACKGROUND OF THE INVENTION

The legionnaire's disease is caused by the pathogen *Legionella pneumophila*, which is a common microorganism in nature. The legionnaire's disease, as well as other diseases caused by Legionella bacteria, are severe conditions of epidemiological character which have even been known to cause death. More specifically, the bacteria will colonize water supply systems, water heaters, showers, jacuzzi whirl pools etc. Severe problems have e.g. been observed in hospitals, in which cases the only solution has been to change the already colonized pipings to all new equipment. Other fields where contamination by Legionella has been seen to cause problems are e.g. in the aerosol and rinse water of dentists and dental surgeons.

Temperatures of between 30–40° C. have been shown optimal for the growth of Legionella bacteria. In such an environment, a kind of biological film, or biofilm, comprising various bacteria and microorganisms, will appear. Some materials in pipes and packings as well as where air pockets are formed, will enhance growth of the Legionella bacteria. In our modern society, in order to reduce costs, energy consumption often is lowered by decreasing the temperature of the hot tap water, whereby the growth of Legionella bacteria is in fact encouraged, in turn resulting in an increased number of individuals afflicted with the diseases caused by Legionella. Accordingly, there is an increased need of methods which effectively control Legionella colonization at reasonable costs.

Prior art methods of eliminating Legionella are by hyperchlorination, thermal treatment. UV radiation, by adding metal ions such as copper and silver ions. Of these, the simplest method has been the thermal treatment, i.e. heating the water to a temperature sufficient to kill the Legionella bacteria present therein, a method which however suffers from the drawback of increased energy costs and risks of skin burns by hot tap water. On the other hand, hyperchlorination has the main disadvantage of corroding the water piping system and of possible production of carcinogenic by-products. UV treatment may give rise to the formation of calcareous deposits on the UV source, reducing the efficiency of the treatment, and to a possible damage of the lamps by contact with water. In the chemical water treatment with metal ions there is an inherent risk of pollution of the water by the chemicals added. Another proposed method is to kill the bacteria by use of 70% ethanol. The use of ethanol, however, gives rise to a fire risk. Moreover, the remedy obtained using these methods is only temporary and with time the contamination problem is susceptible of reappearing.

Ozone has been suggested in the prior art for the control of various microorganisms. In nature, ozone is formed in the stratosphere and forms a layer protecting life on earth from deleterious UV radiation. Ozone as such is a strong oxidant and a toxic gas capable of quickly and efficiently killing bacteria and virus. Accordingly, correctly used, ozone may be an advantageous disinfectant, even though caution must be exercised to avoid harm on the environment and human beings.

It is known to use ozone in high concentrations for disinfecting water from contamination by e.g. Legionella species. Indeed, U.S. Pat. No. 5,882,588 describes a process for continuously disinfecting hot water using ozone. More specifically, said patent relates to the use of heat transfer means to achieve hot water, of a temperature around 50° C. which under a reduced pressure is brought to a treatment tank. Meanwhile, an ozone containing gas, having a concentration of ozone of preferably 2–10%, is fed to the treatment tank from an ozonizer, wherein ozone has been produced from oxygen. The pH is controlled in said tank by addition of HCl. In this patent it also is stated: "It can be learned from scientific literature that a dose of 1–2 mg/l of ozone is expedient for the treatment of tap water".

In the preferred embodiment of the above cited U.S. Pat. No. 5,882,588 the ozone containing gas is introduced into the hot water in the reactor by passing it through a ceramic frit or analogous distribution means, so that the ozone containing gas passes through the water in the form of bubbles. Another patent, U.S. Pat. No. 6,001,247 relates to an improved ozone dissolution system, wherein a sidestream venturi injection system is combined with a specially, designed downflow tube. The advantageous effect provided by this patent is a decreased risk of the gas bubble channelling which may occur when higher ozone concentrations, such as 8–12% by weight, are combined with lower gas flows. The system according to this patent is however a complicated apparatus comprising several diffusion chambers, reaction tanks etc, which requires a complex setting of tubing.

Application of ozone as a disinfectant also has been proposed in WO 981647, A2 (Long, Ron). This patent application relates to a point-of use filtration and ozonation drinking water treatment system and process. The amount of ozone to be injected into the water in order to disinfect it is not indicated. However a retained ozone residual of between 0.1 and 0.4 parts per million in the disinfected water is mentioned, and it is stated that the ozone-containing water so produced may be of use i.a. for rinsing surfaces, articles and food to reduce microbiological contamination thereof.

Another patent application, EP 0315508 A1 (Kishioka, Takashi) relates to an ozonic bubble water generator which generates ozonic bubble water by mixing ozone into water. The ozonic bubble water is proposed for use e.g. as a disinfecting hand wash. Thus, as in WO 9816473 A2. cited above, an outflow of ozonized water is proposed for use as a disinfectant.

DK 166452 B1 (I. Krueger A/S) relates to a method of ground water treatment wherein ozone is used to sterilise water which has been used to rinse filters for the ground water. It is stated that at an ozone concentration of 0.01 mg/l, as much as 99.9% of the microorganisms present in the rinse water are killed within 1 minute. The ozone treatment of water preferably is performed in a closed reaction tank and the treated water then is returned to the inlet for the non-treated ground water where any residual ozone in the treated water is used in an oxidation reaction of the incoming ground water.

From the above it appears that ozone has been used in various applications, including for treating water in order to eliminate Legionella therefrom. However, until now it has not been possible to eliminate, in a reliable, economical and simple way. Legionella from a system of a flowing water and possibly water droplet aerosol, by use of a very low ozone level and a very short treatment time, permitting to obtain a water outflow and water droplet aerosol which are also essentially free from ozone. This is the object of the present invention.

SUMMARY OF THE INVENTION in contrast to the teachings of the prior art documents, according to the present invention elimination of essentially all of Legionella bacteria present in a flow of water is obtained at a much lower level of injected ozone, and by a much shorter treatment time, and this makes possible the treatment of the water flow by an apparatus located in close vicinity to the outlet for the flow of water without any risk of outflowing water contaminated with harmful levels of ozone.

The location of the point of treatment in close vicinity to the outlet results in the further advantage of reducing the risk of re-contamination of the water with Legionella downstream of the point of treatment, which re-contamination could occur in case the point of treatment be located farther back upstream in the water supply system.

Consequently, according to the invention, by use of a level of injected ozone as low as 0.01–0.5 mg/liter of water, an essentially total elimination, i.e. killing, of all Legionella bacteria present in a flow of water is obtainable within an extremely short time period of treatment, such as less than one second.

Thus, in a first aspect, the present invention relates to an apparatus for purifying a flow of water, by eliminating any Legionella bacteria present therein which apparatus comprises (a) means for providing ozone;

(b) means for injecting the ozone into the flow of water;

(c) a mixing chamber for mixing the ozone with the flow of water;

(d) an outlet for the flow of water, and (e) electronic control means for the operation thereof;

wherein the mixing chamber is of an inner geometry such as to create turbulence in the flow of water therein.

Thus, according to an aspect of the invention an apparatus for eliminating Legionella present in a flow of water is provided.

Indeed, the mixing chamber is of an inner geometry geometry such as to provide an essentially total elimination of any Legionella bacteria present in the flow of water entering the mixing chamber.

In a further aspect a method of obtaining a purified flow of is provided, which method comprises the steps of (a) providing ozone;

(b) injecting the ozone into a flow of water susceptible of containing Legionella bacteria.

(c) mixing the ozone with the flow of water within a mixing chamber; and (d) directing the flow of water to an outlet wherein the mixing of the ozone with the water in step (d) is accomplished by creating turbulence in the flow of the water within the mixing chamber.

By the method of the invention a flow of water free from Legionella bacteria is obtained. It thus is an advantageous aspect of the present method that an essentially total elimination of any Legionella bacteria present in the flow of water entering the mixing chamber is achieved to provide a flow of water which is essentially free from any Legionella bacteria on exiting from the mixing chamber.

Thus, according to a very advantageous aspect the invention present provides a simple, reliable and economical method of eliminating Legionella from a flow of water, such as tepid water for taps or showers, without any risk of a possible presence of any harmful residual treatment chemical in the water delivered to the user, as well as an apparatus therefor.

It is a very advantageous aspect of the invention that elimination of Legionella is achievable directly on-line in the flow of water essentially without any delay after actuating the valve regulating the outflow of water.

Aspects of the invention are further defined by the appended claims.

BRIEF DESCRIPTION OF THE DRAWINGS

FIG. 4 is a schematic cross-sectional view of an outlet for water according to the invention;

FIG. 5 is a schematic cross-sectional view of an embodiment of a holding tank according to the invention; and FIG. 6 is a schematic cross-sectional view of another embodiment of a holding tank according to the invention.

DETAILED DESCRIPTION OF THE INVENTION

Figure 1:
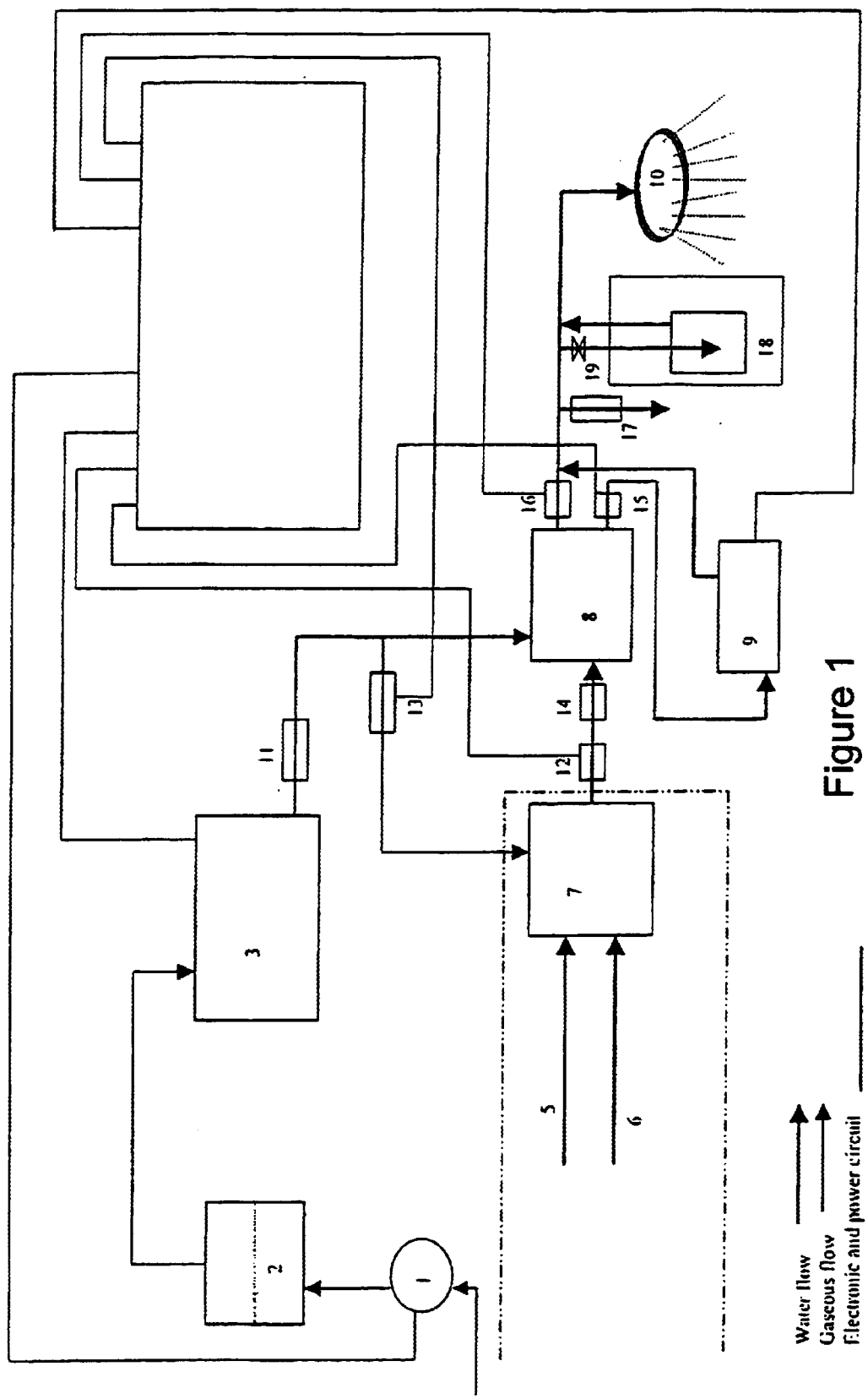
FIG. 1 is a bloc diagram representing one embodiment of an apparatus for disinfecting water according to the invention.

According to a first main aspect of the invention, an apparatus for obtaining a flow of water which is essentially free from Legionella bacteria is provided. The apparatus of the invention basically comprises a source of ozone, means for injecting the ozone into a flow of water, a mixing chamber for ozone and the flow of water, an outlet for the flow of water, and optionally also an electrolytic chamber and filtering means preceding the outlet for the flow of water.

The source of ozone preferably comprises an ozone generator generating ozone from the oxygen in a flow of an oxygen containing gas, to provide an outflow of an ozone containing gas. Most preferably it comprises a means for collecting a flow of air from the surroundings and an ozone generator for generating ozone from the oxygen of the flow of air, to provide an outflow of an ozone containing gas.

It should be understood that although the surrounding air is a most convenient source for obtaining ozone, the invention is by no means limited to this source. Also, the term "ozone containing gas" should be interpreted to mean any appropriate gas containing the required level of ozone. It should also be construed to include the withdrawn air containing a required level of ozone after passage through the ozone generating means.

Preferably the source of ozone comprises means for drying and/or eliminating particles from the flow of gas, such as the flow of air, before it enters the ozone generator, e.g. a filter unit comprising a molecular sieve for eliminating humidity and a particle filter for eliminating particles.

The ozone generation per se is well known to those of skill in this field and suitable means and measures are easily devised, optionally with reference to the literature within this field. In an advantageous embodiment of the invention, a plasma resonance technique may be applied for generating an ozone containing gas from a flow of oxygen containing gas, e.g. a flow of surrounding air withdrawn by means of an air pump. As an example, an apparatus sold under the name of Ozonize by GRP Ltd. of Japan may be applied to this end, whereby ozone may be produced at a rate of 0.05–1 g/hour at a gas flow of about 0.4–2.0 l/min. Though the method of the invention is not limited to any special technique for producing ozone, the produced ozone containing gas most advantageously should be essentially free from nitrous oxides, so called $NO_x$. In the most advantageous embodiment, the means for generating an ozone containing gas has been set to provide an ozone concentration of from 0.1–2% by weight, more preferably 0.5–1% by weight.

Injection of ozone into the water flow is facilitated by generating a pressure drop in the flow at the point of injection of the gas, i.e. by a venturi effect. For example, by providing a device having an inlet opening for the water flow and an outlet opening for the liquid flow, and having an inlet for the gaseous flow in a side-wall, and wherein the liquid inlet opening is substantially narrower than the liquid outlet opening, e.g. having a diameter which is 1.5–5 times smaller, more preferably 2–3 times smaller, injection of the flow of gas into the liquid flow is through the gas inlet is facilitated. As an example, an inlet opening may have a width of 1–4 mm, more preferably 1–3 mm and an outlet opening may have a width of 4–8 mm, more preferably 5–6 mm. In general, a conventional venturi tube-shaped device, such as is described e.g. in McGraw-Hill Encyclopedia of Science & Technology, volume 14, pp. 346 (1977) will be appropriate. The gas flow inlet of the gas injection device preferably is preceded by a nonreturn valve or functionally equivalent means, to prevent backflow, e.g. into the ozone generator.

In a preferred embodiment, the venturi tube-shaped device is the mixing chamber of the apparatus of the invention. The mixing chamber is a central part of the apparatus of the invention, in that it provides a thorough mixing of ozone and water as well as an enhanced contact between the ozone and the Legionella bacteria possibly present in the water flow, in a way enough efficient as to provide an essentially total killing of the Legionella bacteria within the time of flow from the inlet to the outlet of mixing chamber. This is accomplished by the mixing chamber having an inner geometry which provides a turbulent flow therein.

In one embodiment of a mixing chamber having such an inner geometry, the mixing chamber is equipped with at least two baffles, located at a distance from each other in the flow direction, and extending inwards in an essentially opposite direction to each other from the inner walls and in an essentially perpendicular direction to the water flow. Each baffle should extend over more than 50% or more than 75%, preferably more than 90% or about 95% of the diameter of a section of the mixing chamber essentially perpendicular to the water flow. For example, in a mixing chamber having an inner diameter of 20 mm, a passage of 1–2 mm may be left open by the inwardly extending baffle.

In another embodiment of a mixing chamber according to the invention, the mixing chamber comprises a restriction located at a distance from the inlet of the mixing chamber as well as the outlet of the mixing chamber, and an obstruction located at a small distance downstream of this restriction. By forcing thus the flow of water and gas through the restriction and providing an obstacle on which the flow impinges, turbulence and breaking up of possible bacterial colonies are enhanced. The restriction may be provided by two baffles, located directly opposite to each other and extending inwards from the side walls over less than 50% of the diameter of the mixing chamber so as to leave a narrow slot open for the flow. Alternatively, it may be provided by one plate, integral with the walls of the mixing chamber and having a suitably shaped aperture for the flow of water.

Indeed, it is thought that by this turbulent flow, not only an efficient mixing of the ozone containing gas and the water susceptible of containing Legionella is achieved, but also any colonies of Legionella bacteria are efficiently broken down so as to expose each bacterium and thus make it more accessible to oxidation by the ozone. In this way, and by use of the control means as will be described herein below, elimination of Legionella in the water flow is obtainable on-line without any noticeable delay from the turning on of the water flow.

The invention thus allows for a very rapid eliminating of essentially all of the Legionella bacteria entering the mixing chamber at a very low level of ozone. The water flowing out of the water outlet will consequently be free of any Legionella and also have no harmful level of residual ozone left, and more preferably has essentially no residual ozone.

Generally, the mixing chamber will have a length of less than 100 mm, preferably less than 70 mm or even less than 50 mm, e.g. from 25 to 40 mm, and an inner width of less than 30 mm, preferably less than 25 mm, e.g. from 18 to 22 mm. Obviously, the mixing chamber has a generally narrow width, which also serves to enhance the contact of the ozone and the water.

The term "inner", as used herein in relation to the geometry of the mixing chamber, should be understood to refer to the geometry inside the chamber, i.e. the shape of those parts of the chamber which face the lumen of the same, and which are susceptible of coming into contact with the flowing water.

The material of the walls of mixing chamber 8 may any material which is suitable for the intended use, e.g. withstands the pressure of the flow of water, and may be e.g. Teflon® or stainless steel. However, in case the walls of mixing chamber are made from a material which is destructive to ozone, the inside of these walls should be coated with an appropriate material.

In one embodiment of the invention, surfaces inside the mixing chamber which are susceptible of contacting the water flow will be coated with a material which is both highly inert to ozone and resistant to fouling by microorganisms. Such a material may be selected from e.g. silicone, Teflon® and titanium dioxide. More preferably, this coating will cover the entire surface area within the mixing chamber susceptible of coming into contact with the flow of water.

In another embodiment of the invention, surfaces inside the mixing chamber which are susceptible of contacting the water flow will be coated with a material which has a catalytic activity such as platinum on activated carbon or on alumina, Pt/C or $Pt/Al_2O_3$.

Without wishing to be bound to any theory, it is generally thought that ozone may react directly with bacteria present in the flow of water or by the intermediate creation of hydroxyl radicals from the water molecules of the flow, which radicals in turn may react with the bacteria present. An inert coating of the mixing chamber then would favour reaction of ozone with water and bacteria, whereas a catalytic coating would favour reaction of ozone with water. Both types of coatings thus would serve to further enhance the killing of bacteria present in the water flow.

In a further embodiment of the invention, the apparatus comprises an electrolytic chamber. This chamber makes it possible to regulate the pH of the water flow to a desired value. The pH may be selected anywhere between approximately pH 4 and 10 but it is preferred to select a basic pH, i.e. higher than pH 7. Indeed, at alkaline pH values bacterial growth is inhibited. The basification of the water by means of passage through the electrolytic chamber thus may be foreseen as an auxiliary precautionary measure against the presence of Legionelia bacteria in the flow of water. Electrolytic chambers are commercially available e.g. from DAB Medical of Korea.

Although the initial ozone concentration in the water is low, so as to eliminate any risk of harmful ozone levels in the outflowing water, in one embodiment of the invention, a filtering means preceding the water outlet may be provided as an extra precautionary measure, whereby any residual ozone is eliminated from the outflowing water and wherein additionally particles such as killed Legionella bacteria are retained. This filtering means preferably is a filter plate having a porous structure such as a 30–60 mesh sieve and a small thickness, such as 1–5 mm, more preferably 2–3 mm, so as not to give rise to an undue increase of pressure within the water flow. It comprises a metal oxide, such as manganese dioxide, $MnO_2$, on a plate of activated carbon.

The functioning and power supply of the apparatus of the invention is under the control of electronic control means, which may comprise pre-programmed microchips to control parameters such as the parameters of the source of ozone, the water volume rate of flow, the temperature of the water, the pH of the water etc.

In one specific embodiment of the invention, the means for mixing ozone containing gas with water has been integrated in close vicinity to the outlet for the water, such as in a shower mounting. The invention also relates to such an integrated unit as such, i.e. comprising means for mixing and an outlet, e.g. in the form of a shower handpiece, a tap etc. Such a unit is advantageous due to its great simplicity, enabling use of already installed water supply systems simply by introducing the present unit. Accordingly, no expensive new investments are required, and there is no need to heat the water to high temperatures to prevent colonization of Legionella.

According to a further aspect, the present invention relates to a unit for eliminating Legionella from a flow of water, which comprises the apparatus described above fitted in a housing. In one embodiment, the present unit is a small, compact tin or box made from a corrosion resistant material, which is suitable for simple use in environments where Legionella bacteria may be expected, or where the consequences of any presence of such bacteria would be detrimental, such as in hospitals. The present unit is adapted to be connected to a tubing, e.g. made from silicone or Teflon®, which is fitted into the shower mounting or water outlet to provide mixing of outflowing water with ozone. As the unit never needs to contact the water, the electronics therein will be protected from any damage and the system wherein the present unit is used will therefore also be safe for the user. By an appropriate fitting of the unit to the water outlet, elimination of Legionella will be accomplished every, time the tap is switched on, thus operating in an isolated or non-continuous mode, contrary to the prior art continuous methods.

The present apparatus of course will include arrangements of tubings, valves, pumps etc in appropriate materials for a reliable operation. The skilled person in this field will without undue burden set up such an apparatus with reference to his common general knowledge of the field and the appended drawing and example. As for the electronic devices and circuits required to control the present apparatus, such are becoming more and more common in various chemical plants. It therefore will be within the knowledge of the skilled person to choose the appropriate equipment, optionally after consultation of specialists in the field of electronic control devices and process control.

According to another main aspect of the invention, a method of obtaining a flow of water which is essentially free from Legionella bacteria is provided, which method basically comprises the steps of providing a source of ozone, injecting the ozone into a flow of water, mixing the injected ozone with the flow of water by creating turbulence therein, and passing the flow of water to an outlet for water.

In an advantageous embodiment, the source of ozone is provided by creating a flow of ozone containing gas. This may be accomplished by passing a gaseous phase flow containing oxygen through a means for generating ozone. More preferably such gaseous phase simply is air.

Thus, in working a preferred embodiment of the present method, air from the surrounding room is collected into the apparatus via suitable means, such as a pump. The quality of the air preferably is improved by removal of undesired material, such as particles and humidity, e.g. by use of a filter, wherein particles and humidity are trapped. Said filter may be exchanged for any other suitable means, which means is easily selected by the skilled person in this technical field. The air is passed through a chamber or vessel, wherein ozone is produced from the oxygen of the preferably dry air. Advantageously, the ozone containing gas, comprised of ozone and air, is subjected to a slight overpressure, such as 0.01–0.3 bar, preferably 0.03–0.2 bar. This slight overpressure facilitates the subsequent injection of the gas flow into the water flow.

Ozone suitably is injected into the water flow to reach a maximum level of ozone of about 0.01–0.5 mg/l. The electronic control means controls the volume rate of flow of the gaseous phase which is injected into the flow of water to a suitable value in accordance with the volume flow rate of the water flow, so that, having regard to the level of ozone in the gaseous phase, an appropriate flow of ozone is injected.

The flow rate of the water preferably is below 15 liters per minute or below 10 liters per minute and of course may be very low, such as 1 liter/min and lower.

It is an advantageous aspect of the invention that the temperature of the water flow to be treated is not critical. Indeed, it may range between the temperature of cold and hot water, respectively such as e.g. between 10 and 60° C. However, by use of the invention the need of heating the water up to 60° C. in order to eliminate the risk of contamination by Legionella will be substantially avoided. Consequently, by applying the method and apparatus of the invention, it will be possible to reduce the temperature of the hot water to any desired temperature, e.g. to between 38° C. and 50° C. depending on the hot water requirements.

In one embodiment of the invention the water flow is passed through an electrolytic chamber wherein the water pH may be regulated to a desired value. For example, a pH between 4 and 10 may be set, as desired. A basic pH, i.e. pH>7, more preferably pH>8. will result in an inhibition of any bacterial growth within the water flow. The electrolytic chamber thus may serve as an auxiliary means of providing a water outflow essentially free from any bacteria.

In another embodiment of the invention, the water flow is subjected to a filtering step to eliminate any residual ozone before exiting from the outlet. However, it should be noted that even without this filtering step, any inadvertent residual ozone level in the water outflow will be negligible from a security point of view as it is at most about 0.5 mg/l water in the mixing chamber, and may even usefully be as low as at most 0.01 mg/l in the mixing chamber. If desired, a sampling port, may be provided at an appropriate site in the system, e.g. directly upstream of the outlet for the flow of purified water.

In a further embodiment of the invention, where mixing chamber is situated within a flexible shower hose, the shower system comprising thermostat, the flexible shower hose and mixing chamber is periodically flushed by injection of ozone therein. This is performed when the shower is not in use, under the control of the electronic control means.

It should be understood that in the light of the present disclosure the apparatus and method of the invention is applicable to any fluid system where a need for eliminating Legionells exists, by performing the appropriate modification. For example, the water purification apparatus and method of the invention could be applied for eliminating Legionells from the spray (aerosol) and rinse water of dentists and dental surgeons. In this case the apparatus preferably will comprise a holding tank downstream of the mixing chamber. This holding tank preferably is made of a material such as stainless steel and equipped with an inlet for the purified water flow, a circulation loop providing an A outlet for the rinse and spray water by means of a pump and a valve as well as a draining outlet for emptying the tank. Furthermore, a gas exhaust is provided, e.g. comprising a pressure guard valve, which senses a rise in the internal gas pressure of holding tank and opens to restore normal pressure by venting off excess gas. As a security measure, the pressure guard valve may be followed by a filter unit for eliminating any residual ozone in the gaseous flow.

In one embodiment the apparatus of the invention comprises a slightly modified version of the holding tank located downstream of the mixing tank. This modified version of a holding tank will not comprise any circulation loop but simply an inlet for purified water and an outlet for the same and preferably is connected to the water line by means of a shut-off valve.

The invention will now be further described by reference to the appended drawings. The drawings and the description should be construed as non-limiting examples of embodiments of the invention. They consequently should be construed merely as an illustration of the invention, and are by no means intended as a limitation to the scope thereof.

The cross sectional views, being only schematic, generally represent the walls only as lines without any thickness, although of course these walls should be understood to have a useful thickness, such as e.g. to withstand a flow of water.

FIG. 1 schematically represents one embodiment of an apparatus according to the invention. This apparatus comprises a pump 1, for pumping air from the surroundings. The pump 1 is via tubing connected to a filter assembly 2, comprising a particle retaining filter and a humidity absorbing molecular sieve. On the outlet side, filter assembly 2 is connected to ozone generator 3. Ozone generator 3 is via nonreturn valve 11 connected on the one hand to mixing chamber 8 and on the other hand via magnetic valve 13 to thermostat 7.

Magnetic valve 12, followed by flow regulator 14, mixing chamber 8 and magnetic valve 16 are located on the water line downstream of thermostat 11. On the outlet side of magnetic valve 16 the line finally debouches in the water outlet 10, here illustrated as a shower mouthpiece.

On the gas line leading from the ozone generator 3 to the mixing chamber 8 a nonreturn valve 11 is located, to protect from any backflow of water into the ozone generator 3. An opening for injection of the ozone containing gas is provided in a side wall at the inlet side of mixing chamber 8.

The inner geometry of mixing chamber 8 is such as to facilitate injection of the ozone containing gas flow through into the water flow and to provide thorough mixing of the ozone and the liquid phase as well as breaking up of any bacterial colonies therein.

Figure 2:
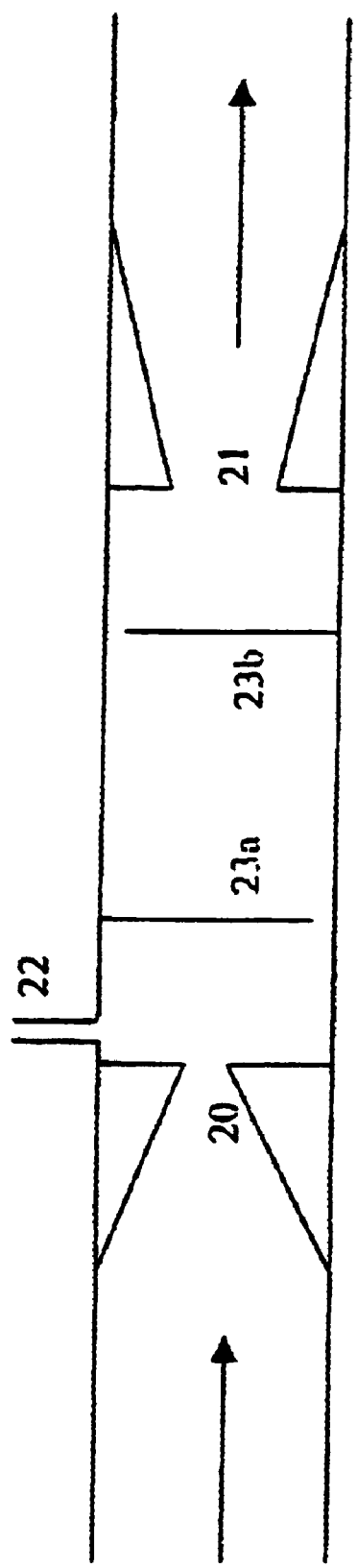
FIG. 2 is a schematic cross-sectional view of an embodiment of a mixing chamber according to the invention.

FIG. 2 represents one embodiment of mixing chamber 8, having an inlet opening 20 and an outlet opening 21 for the water flow as well as an inlet opening 22 for the gaseous ozone containing flow in a side wall in close vicinity to the inlet opening for the water flow. The inlet opening 20 is narrower than the outlet opening 21. At a distance from the inlet side a first baffle 23a is located, followed by a second baffle 23b further downstream. The baffles 23a, 23b, both rigid and solid (integral) with the inner wall, extend from a side wall in a direction substantially perpendicular to the flow of water and in substantially opposite direction to each other. The diameter of inlet opening 20 is 1–3 mm; the diameter of outlet opening 21 is 5–6 mm, the length of the mixing chamber 8, as measured from the inlet opening 20 to the outlet opening 21, is 25–35 mm and the inner diameter of mixing chamber is 20–22 mm. The baffles 23a, 23b, extending in opposite direction each leave an opening passage for the flow of approximately 1–2 mm.

Figure 3:
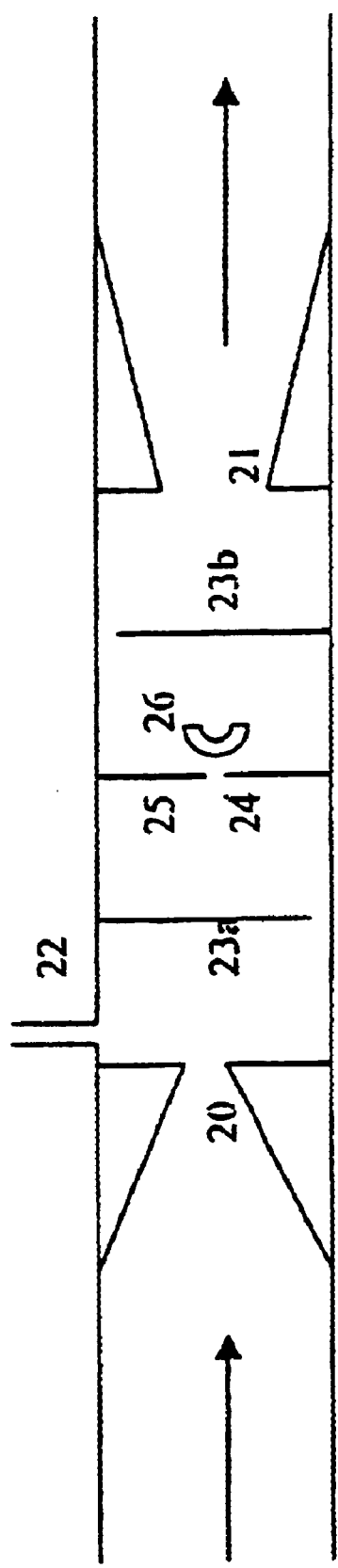
FIG. 3 is a schematic cross-sectional view of another embodiment of a mixing chamber according to the invention.

FIG. 3 represents a further embodiment of mixing chamber 8, having additionally a restriction for the flow of water downstream of baffle 23a. This restriction is provided by means of a rigid plate 24, solid with the inner walls of mixing chamber 8, having a small opening 25 for the flow of water. A curved baffle 26, located downstream of plate 24 and facing the opening 25, provides an obstacle to the flow emerging through opening 25. The curved baffle 26, with its convex side towards the opening, will provide an impact surface further enhancing turbulence and disruption of bacterial colonies present in the water flow.

An electrolytic chamber 9 is connected to mixing chamber 8 via a magnetic valve 15, permitting to regulate the pH of the water flow at a desired value.

A shut-off valve 17 of the type with rotary ball (Ballofix®) is provided to allow for manual sampling of the water flow downstream of mixing chamber 8.

Within water outlet 10, here a shower mouthpiece, a filter plate is located, whereby any residual ozone is eliminated from the outflowing water and wherein additionally particles such as killed Legionella bacteria are retained. In FIG. 4 the structure of an embodiment of such a filter plate as well as its positioning within the water outlet 10 is schematically shown. This filter plate is of a porous structure such as a 30–60 mesh sieve, and has a thicknessof 2–3 mm. It is comprised of a porous plate of activated carbon 27 carrying a layer 28 of a metal oxide, such as manganese dioxide, $MnO_2$.

Finally, the apparatus comprises electronic control unit 4 to allow for the control of and power supply to pump 1, ozone generator 3 and electrolytic chamber 9 as well as the control of magnetic valves 12, 13, 15 and 16.

Additionally represented in FIG. 1, but not comprised in the apparatus per se, are cold and hot water pipings 5 and 6 and thermostat 7, all conventional to any system for delivering thermostated water.

FIG. 5 schematically represents a holding tank 29 for use in association with the apparatus of the invention as applied for eliminating Legionella from a dentist's rinse or spray water. Holding tank 29 preferably has a volume of 0.5–1 liter and is made of a material such as stainless steel. It comprises an inlet 30 for the flow of purified water, a bottom draining valve 31 for emptying the tank if necessary, and a circulation loop 32 comprising a pump 33 and a three-way valve 34. A gas exhaust is provided by means of a pressure guard valve 35, which senses a rise in the internal gas pressure of holding tank and opens to restore normal pressure by venting off excess gas. Pressure guard valve 35 is followed by a filter unit 36 comprising activated carbon.

In use, a flow of purified water from mixing chamber 8 enters holding tank 29 through inlet 30 until a preselected level is reached within holding tank 29, whereupon the flow is disrupted. By the action of pump 33, circulation of the water within the holding tank 29 and through the circulation loop 32 is obtained. By actuating the three-way valve 34, a flow of water may be withdrawn, to be used as a rinse or spray water.

In FIG. 6 holding tank 18 is represented, being a simplified version of holding tank 29 as represented in FIG. 5. Holding tank 18 is thus comprises an inlet for water 30, connected by means of shut-off valve 19 to the water line, i.e. the piping for the flow of water. Holding tank 18 furthermore comprises a siphon tube 37 and an outlet 38 for water, outlet 38 being connected to to the water line which debouches in water outlet 10.

The functioning of the apparatus according to FIG. 1 will now be described. By opening the magnetic valve 16 under the control of electronic control unit 4, water, such as a mixture of municipal cold and hot water entering through pipings 5 and 6 and mixed in thermostat 7 to a suitable temperature, e.g. 25–38° C. starts flowing out of outlet 10 at a flow rate regulated by flow meter 14. The control unit 4 regulates the flow rate of the ozone containing gas in accordance with the water flow rate. Air pump 1 simultaneously starts pumping in air from the surroundings into ozone generator 3, at a volume flow rate controlled by electronic control means 4. The quality of the air is improved by removal of particles and humidity in filter 2, wherein particles and humidity are trapped, whereafter the air flow enters ozone generator 3. In ozone generator 3, ozone is generated from oxygen of the dried air, which generation is controlled by control unit 4. The ozone containing gas flow exiting from ozone generator 3 is fed through nonreturn valve 11 into mixing chamber 8 at a slight overpressure. Injection of the ozone containing gas into the flow of water within mixing chamber 8 is obtained by a venturi effect. Within the mixing chamber 8 the flow of water and injected ozone containing gas is a turbulent flow, due to the special geometry of the mixing chamber 8. This turbulent flow will have the effect of decomposing the colonies of Legionella susceptible of being vehicled by the water flow and of providing a thorough mixing of fluids and bacteria. The surfaces inside the mixing chamber are coated either with a material inert towards ozone or acting as a catalyst for the reaction of ozone and water molecules to generate hydroxyl radicals to further enhance the killing of the Legionella bacteria. The water flow leaving mixing chamber 8 is fed through magnetic valve 16 under the control of control unit 4 and finally flows out of water outlet 10, e.g. a shower mouthpiece.

Before leaving water outlet 10, the water flow is filtered through filter plate immediately preceding outlet 10, as a security measure to remove any residual ozone in the flow by decomposing it to oxygen molecules.

Water flow leaving mixing chamber 8 is fed through magnetic valve 15 into electrolytic chamber 9 and from there to outlet 10.

In the embodiment of the invention, where mixing chamber 8 is situated within a flexible shower hose, the shower system comprising thermostat 7, the flexible shower hose and mixing chamber 8 is periodically flushed by injection of ozone therein. This is performed when the shower is not in use, under the control of control unit 4. For example, at pre-programmed intervals of time, under the influence of control unit 4, pump 1 and ozone generator 3 start to work, magnetic valve 12 and 13 open and a short-time flushing of the system by ozone through valves 11, 13, 12, 16, flow regulator 14 and mixing chamber 8.

What is claimed is:

1. A method for purifying a flow of water in a water flow line by use of an apparatus comprising
   (a) means for providing a flow of an ozone-containing gas;
   (b) means for introducing the flow of the ozone-containing gas into the flow of water;
   (c) a mixing chamber for turbulent mixing of the ozone-containing gas with the flow of water, located on the water flow line in the vicinity of
   (d) an outlet for the flow of water; and
   (e) electronic control means adapted to control the operation of said apparatus, thereby providing a flow of water which on exiting through the outlet for the water flow is essentially free from residual ozone and from contamination by Legionella bacteria wherein the ozone-containing gas is introduced into the flow of water so as to maintain
      (i) a concentration of ozone in the water within the mixing chamber of about 0.01–0.5 mg/l; and
      (ii) a contact time between the ozone-containing gas and the water that is essentially equal to the time of continuous flow of the water flow from a water inlet of the mixing chamber to the outlet for the water.

2. A method according to claim 1 wherein the mixing chamber comprises at least two baffles.

3. A method according to claim 2 wherein the baffles extend from an inner wall of the chamber in a direction essentially opposite to each other and essentially perpendicular to the flow of water.

4. A method according to claim 1 wherein the mixing chamber has the general form of a venturi tube.

5. A method according to claim 1, wherein surfaces inside of the mixing chamber that are susceptible of contact with the water flow are made of a material that is essentially inert towards ozone.

6. A method according to claim 1, wherein surfaces inside of the mixing chamber that are susceptible of contact with the water flow are made of a material having a catalytic activity.

7. A method according to claim 1, wherein the apparatus comprises a filter unit located downstream of the mixing chamber, which filter unit is capable of eliminating any residual ozone and/or particles such as killed Legionella bacteria from the water flow.

8. A method according to claim 7, wherein the filter unit comprises a metal oxide on a plate of activated carbon.

9. The method according to claim 8 wherein the metal oxide is manganese dioxide.

10. A method according to claim 1, wherein an electrolytic chamber regulates the pH of the water flow to a desired value.

11. A method according to claim 1, wherein the contact time between the ozone-containing gas and the flow of water is less than one second.

12. The method according to claim 1 wherein the water flow line is in a tap, a shower head, or a shower handpiece.

* * * * *